United States Patent
Zhao et al.

(10) Patent No.: US 11,379,551 B2
(45) Date of Patent: Jul. 5, 2022

(54) LATENCY MINIMIZATION IN MOBILE APPLICATIONS

(71) Applicant: University of Southern California, Los Angeles, CA (US)

(72) Inventors: Yixue Zhao, Los Angeles, CA (US); Nenad Medvidovic, Los Angeles, CA (US); Marcelo Schmitt Laser, Los Angeles, CA (US); Yingjun Lyu, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 16/831,482

(22) Filed: Mar. 26, 2020

(65) Prior Publication Data

US 2020/0311173 A1 Oct. 1, 2020

Related U.S. Application Data

(60) Provisional application No. 62/823,925, filed on Mar. 26, 2019.

(51) Int. Cl.
*G06F 16/957* (2019.01)
*H04L 67/146* (2022.01)
(Continued)

(52) U.S. Cl.
CPC ...... *G06F 16/9574* (2019.01); *G06F 16/9566* (2019.01); *H04L 67/146* (2013.01); *H04L 67/2847* (2013.01)

(58) Field of Classification Search
CPC ............ H04L 67/146; H04L 67/2847; G06F 16/9574; G06F 16/9566
See application file for complete search history.

(56) References Cited

U.S. PATENT DOCUMENTS

| | | | |
|---|---|---|---|
| 8,775,631 B2 * | 7/2014 | Luna | H04L 67/22 709/226 |
| 2010/0191856 A1 * | 7/2010 | Gupta | H04L 29/12066 709/228 |

(Continued)

OTHER PUBLICATIONS

Zhao, Yixue, et al; "Leveraging Program Analysis to Reduce User-Perceived Latency in Mobile Application," May 27, 2018, ICSE, 2018, pp. 176-186. (Year: 2018).*

*Primary Examiner* — Azizul Choudhury
(74) *Attorney, Agent, or Firm* — Snell & Wilmer LLP

(57) ABSTRACT

Systems and methods for reducing latency in use of mobile applications include creating a list of potential internet requests from a mobile application based on an analysis of the mobile application. The systems and methods include creating a trigger map that maps each of a plurality of trigger points of the mobile application with a corresponding target internet request to be prefetched from the list of potential internet requests. The systems and methods include creating a URL map that maps each of a plurality of the potential internet requests with corresponding URL values. The systems and methods include identifying that a current app function matches a trigger point of the plurality of trigger points. The systems and methods include performing the potential internet request in response to identifying that the current app function matches the trigger point prior to the target request being received in order to reduce latency.

8 Claims, 7 Drawing Sheets

(51) Int. Cl.
*H04L 67/5681* (2022.01)
*G06F 16/955* (2019.01)

(56) References Cited

U.S. PATENT DOCUMENTS

2018/0293119 A1* 10/2018 Reichard ............... H04L 67/125
2019/0124671 A1*  4/2019 Starsinic ........... H04W 72/1205
2019/0230186 A1*  7/2019 Yellin ................. H04L 67/2847
2019/0286298 A1*  9/2019 Wantland .............. G06F 3/0481

* cited by examiner

Figure 1: CCFG extracted from Listing 1 by GATOR

FIG. 4

LATENCY MINIMIZATION IN MOBILE APPLICATIONS

CROSS-REFERENCE TO RELATED APPLICATIONS

This application claims priority to and the benefits of U.S. Provisional Patent Application No. 62/823,925, filed on Mar. 26, 2019, and entitled "PALOMA: Program Analysis for Latency Optimization of Mobile Applications," the entirety of which, including any appendices, is incorporated herein by reference for all purposes.

STATEMENT AS TO FEDERALLY SPONSORED RESEARCH

This invention was made with government support under contract numbers CCF-1618231 and CCF-1717963 awarded by the National Science Foundation (NSF), and contract number N00014-17-1-2896 awarded by the Office of Naval Research (ONR). The government has certain rights in this invention.

TECHNICAL FIELD

The present disclosure relates to mobile devices, and more particularly, to systems and methods for reducing latency in mobile devices.

BACKGROUND

In mobile computing, user-perceived latency may be a concern as user-perceived latency directly impacts user experience and often has severe economic consequences. A recent report illustrates that a majority of mobile users would abandon a transaction or even delete an app when the response time of a transaction exceeds three seconds. Google estimates that an additional 500 ms delay per transaction would result in up to 20% loss of traffic, while Amazon estimates that every 100 ms delay would cause 1% annual sales loss. A previous study illustrated that network transfer is often the performance bottleneck, and mobile apps spend 34-85% of their time fetching data from the Internet. A compounding factor is that mobile devices rely on wireless networks, which can exhibit high latency, intermittent connectivity, and low bandwidth.

SUMMARY

In various embodiments, latency may be reduced in use of mobile applications. A prefetching technique which may have the potential of reducing latency to zero or near zero is disclosed. The approach may prefetch latency-hogging HTTP requests in mobile applications, which may enable immediate responses of the on-demand user requests. An example may identify the request candidates for prefetching by static analysis, rewrite the app to interact with a proxy instead of the original server, and prefetch HTTP requests based on runtime QoS constraints.

In an embodiment, a method for reducing latency in use of mobile applications includes creating, by a processor, a list of potential internet requests from a mobile application based on an analysis of the mobile application. The method includes creating, by the processor, a trigger map that maps each of a plurality of trigger points of the mobile application with a corresponding target internet request to be prefetched from the list of potential internet requests. The method includes creating, by the processor, a uniform resource locator (URL) map that maps each of a plurality of the potential internet requests with corresponding URL values. The method includes identifying, by a mobile processor, that a current app function matches a trigger point of the plurality of trigger points. The method includes performing, by the mobile processor, the potential internet request in response to identifying that the current app function matches the trigger point prior to the target request being received in order to reduce latency.

In an embodiment, a method for reducing latency in use of a mobile application includes creating, by a processor, a trigger map that maps each of a plurality of user interactions with the mobile application with a corresponding target internet request to be prefetched. The method includes identifying, by a mobile processor, that a user action matches one of the plurality of the recorded user interactions in the trigger map. The method includes prefetching, by the mobile processor, the corresponding target internet request.

In an embodiment, a system for reducing latency in use of mobile applications is configured to create, by a processor, a list of potential internet requests from a mobile application based on an analysis of the mobile application. The system may be configured to create, by the processor, a trigger map that maps each of a plurality of trigger points of the mobile application with a corresponding target internet request to be prefetched from the list of potential internet requests. The system may be configured to create, by the processor, a URL map that maps each of a plurality of the potential internet requests with corresponding URL values. The system may be configured to identify, by a mobile processor, that a current app function matches a trigger point of the plurality of trigger points. The system may be configured to perform, by the mobile processor, the potential internet request in response to identifying that the current app function matches the trigger point prior to the target request being received in order to reduce latency.

The foregoing features and elements may be combined in any combination, without exclusivity, unless expressly indicated herein otherwise. The features and elements as well as the operation of the disclosed embodiments will become more apparent in light of the following description and accompanying drawings. The contents of this section are intended as a simplified introduction to the disclosure and are not intended to be used to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 4 is a diagram illustrating 24 cases when an entire URL is not known statically;

DETAILED DESCRIPTION

Figure 1:
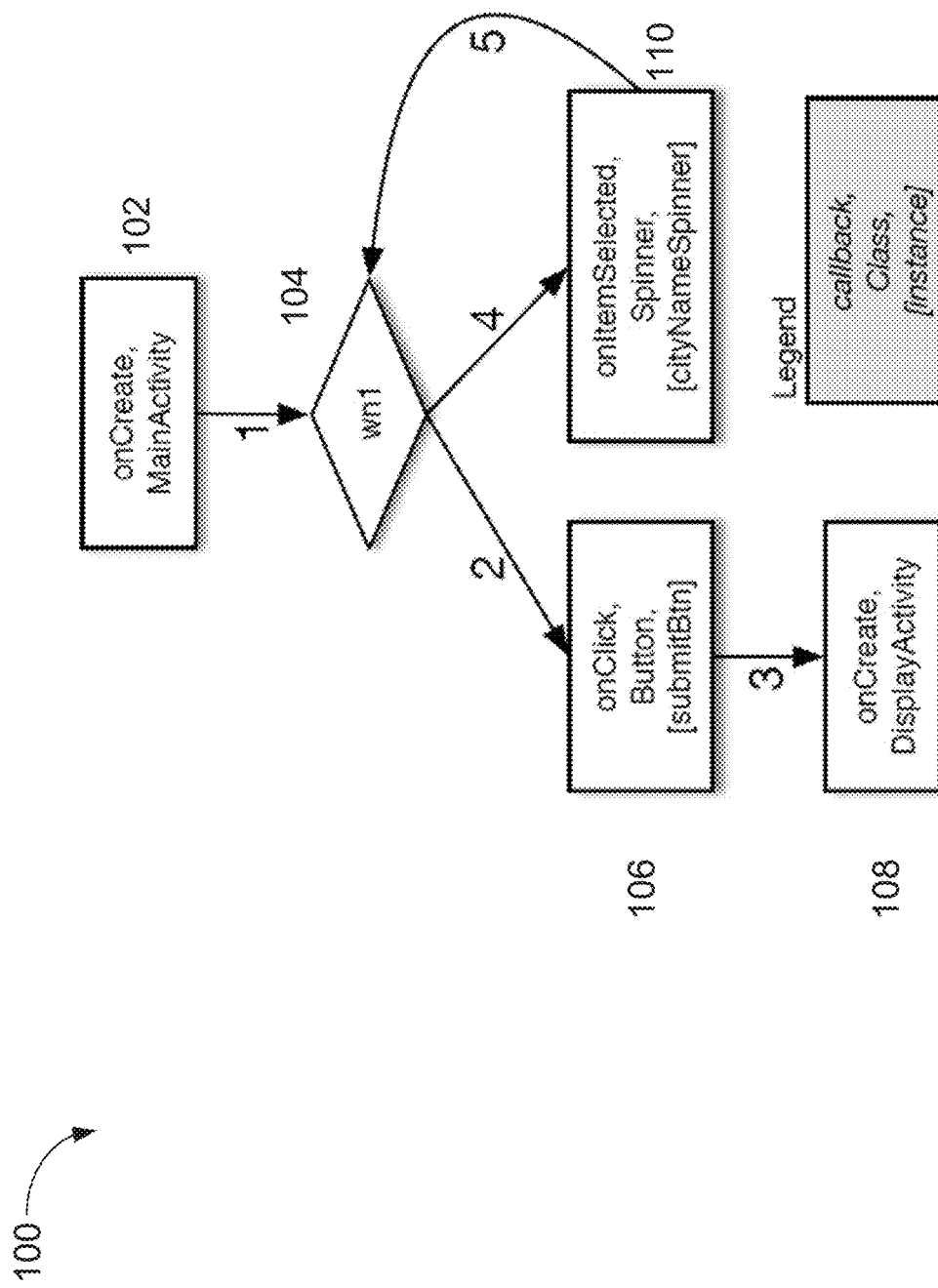
FIG. 1 is a diagram that illustrates a CCFG extracted from Listing 1 using the GATOR analysis technique.

The following detailed description of various embodiments makes reference to the accompanying drawings, which illustrate various embodiments by way of illustration. While the various embodiments are described in sufficient detail to enable those skilled in the art to practice the principles of the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. It should also be understood that unless specifically stated otherwise, references to "a," "an" or "the" may include one or more than one and that reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. Further, all ranges may include upper and lower values and all ranges and ratio limits disclosed herein may be combined.

Over the past decade, pervasive mobile connectivity has changed the way we perceive the world and interact with each other. People can be connected with each other at any time via personal computing devices, e.g., mobile devices. In this context, user-perceived latency may be the first and foremost concern as it directly impacts user experience and often has severe economic consequences. A previous study has shown that network transfers may often cause bottlenecks and mobile apps spend between 34-85% of the time in network transfer. This may be as expected since the majority of apps frequently fetch data from the Internet. Yet, mobile devices may rely on wireless networks, and such networks can exhibit low bandwidth, high latency, and intermittent connectivity.

Thus, reducing network latency may be one of the most effective ways of improving the mobile user experience. Described herein is a client-centric prefetching technique that may minimize the network latency in mobile apps. Latency may be defined as the user-perceived latency caused by a network, e.g., the response time of an HTTP request. Some examples have primarily taken domain-specific approaches that focus on the "actual" latency reduction in different domains, such as optimizing network paths and expanding the deployment of high-speed networks. However, such techniques may be fundamentally incapable of reducing user-perceived latency to "zero" due to the performance bottlenecks, such as network speed. A different approach may be used, aiming to prefetch latency-hogging HTTP requests, which may enable immediate responses of the on-demand user requests. Prefetching may overlap speculative executions with on-demand executions. The systems and methods described herein may be capable of improving existing latency reducing techniques by removing latency completely or nearly completely.

Prefetching may be an entrenched idea in the mobile computing community. However, previous works have been focused on "how" to prefetch under different QoS trade-offs, while leaving "what" to prefetch as an open question. Some solutions leave the "what" question either to application developers who have to explicitly annotate application segments that are amenable to prefetch or to servers that provide "hints" to clients on what to prefetch based on the history of the requests. There are several limitations when relying on developers and server support. First, such approaches are not automatic and pose significant manual efforts in both development and deployment. Second, most of today's mobile applications depend extensively on heterogeneous third-party servers which make deploying server-side "hints" difficult and not scalable. Third, server-side solutions introduce a series of privacy concerns because they require user information from mobile devices to be effective.

However, building a client-centric predictive model to answer "what to prefetch" is a challenging task. Existing works have been building domain-specific models for prefetching. For example, ForeCache builds its model based on data tiles in interactive visualization according to user's recent movements and past behaviors. EarlyBird focuses on the social network domain and only prefetches the constant URLs in tweets. Another body of work focuses on the browser domain to optimize the process of request parsing, such as predicting sub-resources and providing development support for speculative execution. In one embodiment, the proposed described herein may be a general-purpose predictive model on top of the program structure, which provides more accurate prefetching candidates based on the actual program behavior.

Reducing network latency in mobile applications may be an effective way of improving the mobile user experience and has tangible economic benefits. The application presents Program Analysis for Latency Optimization of Mobile Apps (PALOMA), a client-centric technique for reducing the network latency by prefetching HTTP requests in Android apps, for example. It will be understood, however, that the systems and methods described herein may be applied to other mobile operating systems on other mobile devices.

The systems and methods described herein may leverage string analysis and callback control-flow analysis to automatically instrument apps using PALOMA's rigorous formulation of scenarios that address "what" and "when" to prefetch. PALOMA has been shown to incur significant runtime savings (several hundred milliseconds per prefetchable HTTP request), both when applied on a developed reusable evaluation benchmark and on real applications.

Reducing network latency thus becomes a highly effective way of improving the mobile user experience. In the context of mobile communication, latency may be defined as the response time of an HTTP request. A client-centric technique for minimizing the network latency by prefetching HTTP requests in mobile apps is disclosed. Prefetching bypasses the performance bottleneck (in this case, network speed) and masks latency by allowing a response to a request to be generated immediately, from a local cache.

Prefetching has been explored in distributed systems previously. Existing approaches can be divided into four categories based on what they prefetch and when they do so. (1) Server-based techniques analyze the requests sent to the server and provide "hints" to the client on what to prefetch. However, most of today's mobile apps depend extensively on heterogeneous third-party servers. Thus, providing server-side "hints" may be difficult, not scalable, or even impossible because app developers do not have control over the third-party servers. (2) Human-based approaches rely on developers who have to explicitly annotate application segments that are amenable to prefetching. Such approaches are error-prone and may pose significant manual burdens on developers. (3) History-based approaches build predictive models from prior requests to anticipate what request will happen next. Such approaches require significant time to gather historical data. Additionally, building a precise predictive model based on history may be more difficult in today's setting because the context of mobile users changes frequently. (4) Domain-based approaches narrow down the problem to one specific domain. For example, approaches that focus on the social network domain only prefetch the constant URLs in tweets based on user behavior and resource constraints. The approaches cannot be applied to mobile apps in general.

To potentially address the limitations of current prefetching approaches, PALOMA has been developed. PALOMA may be a technique that may be client-centric, automatic, domain-independent, and may require no historical data. Some examples may focus on native Android apps, for example, because of Android's dominant market share and Android's reliance on event-driven interaction, which may be the most popular style used in mobile apps today. In an example, an app's code can provide a lot of useful information regarding what HTTP requests may occur and when. In addition, a mobile user usually spends multiple seconds deciding what event to trigger next. This time may be known as "user think time" providing an opportunity to prefetch HTTP requests in the background. By analyzing an Android program, or other mobile device program, HTTP requests may be identified and certain user-event sequences (e.g., onScroll followed by onClick) may be predicted. With that information, prefetch requests may be determined that will happen next during "user think time."

In some embodiments, user-event transitions are captured as callback control-flow relationships in PALOMA, and targeted, short-term prefetching may be performed—a single callback ahead. There are several reasons for opting for this strategy. First, short-term prefetching minimizes the cache-staleness problem that is commonly experienced by longer-term prefetching because the newly updated cache will be used immediately when the user transitions to the next event. Second, the information needed to send the HTTP requests (e.g., a parameter in an HTTP request that depends on user input) may be more likely to be known since the prefetching occurs very close in time to the actual request. Third, short-term prefetching takes advantage of user think time between callbacks, which has been shown to be sufficient for prefetching HTTP requests. By contrast, prefetching within the same callback would not provide a performance gain since the relevant statements would execute within a few milliseconds of one another.

PALOMA comprises four major elements. (1) String Analysis identifies the "prefetchable" requests by interpreting each URL string. (2) Callback Analysis determines the prefetching points for the "prefetchable" requests by analyzing callback control-flow relationships. (3) App Instrumentation modifies the original app based on the information extracted in the previous phases and outputs an optimized app that prefetches the HTTP requests. (4) Runtime prefetching involves the optimized app and a local proxy that may be in charge of prefetching HTTP requests and managing the responses. PALOMA's first two elements are adaptations and extensions of existing techniques, while the latter two have been newly developed.

PALOMA has been evaluated for accuracy and effectiveness in two different ways. First, a microbenchmark (MBM) may be developed that isolates different prefetching conditions that may occur in an Android app, for example. The MBM can be reused for evaluating similar future approaches. Second, PALOMA may be applied on real Android apps, e.g., 32 apps were tested. An evaluation illustrates that PALOMA exhibits accuracy (in terms of precision and recall) and virtually eliminates user-perceived latency, while introducing negligible runtime overhead.

The application discloses (1) PALOMA, a novel client-side, automated, program analysis-based prefetching technique for mobile apps; (2) a rigorous formulation of program analysis-based prefetching scenarios that addresses "what" and "when" to prefetch; (3) a comprehensive, reusable MBM to evaluate prefetching techniques for Android apps; and (4) the implementation of an open-source, extensible framework for program analysis-based prefetching. PALOMA's source code and supporting materials are publicly available.

Included herein is a discussion of the problem. Additionally, the terms used by PALOMA are defined, the approach used by PALOMA is described as well as the implementation of PALOMA and detail PALOMA's evaluation using a benchmark and real apps. Related work and conclusions are also discussed.

A concrete example is presented to introduce the fundamental building blocks and execution model of mobile apps, with a particular focus on Android. The example introduces insights and motivation, followed by the definition of several terms.

Mobile apps that depend on a network generally involve two concepts: events that interact with user inputs and network requests that interact with remote servers. The concepts are described via Listing 1's simplified code fragment of an Android app that responds to user interactions by retrieving weather information.

Events: In mobile apps, user interactions are translated to internal app events. For instance, a screen tap may be translated to an onClick event. Each event is, in turn, registered to a particular application UI object with a callback function; the callback function may be executed when the event may be triggered. For instance, in Listing 1, the button object submitBtn may be registered with an onClick event (Line 9), and the corresponding callback function onClick( ) (Line 10) will be executed when a user clicks the button. Similarly, the drop-down box object cityNameSpinner may be registered with an onItemSelected event that has an onItemSelected( ) callback function (Lines 5-7).

Network Requests: Within an event callback function, the app often has to communicate with remote servers to retrieve information. The communication may be performed through network requests over the HTTP protocol in most non-realtime apps. Each HTTP request may be associated with a URL field that specifies the endpoint of the request. For instance, in Listing 1, the onClick event callback sends three HTTP requests, each with a unique URL (Lines 12-14).

There are two types of URL values, depending on when the value is known: static and dynamic. For instance, favCityId in Listing 1 may be static because favCityId's value may be obtained statically by reading the application settings (Lines 4, 12). Similarly, getString("domain") reads the constant string value defined in an Android resource file (Line 12, 13, 14). In contrast, cityName may be dynamic since cityName's value depends on which item a user selects from the drop-down box cityNameSpinner during runtime (Lines 7, 13). Similarly, cityId may also be a dynamic URL value (Lines 11, 14).

the code. For example, Line 7 would contain Definition Spot $L7_{3,1}$ for url2 because cityName may be the third substring in url2 and Line 7 may be the first definition of cityName.

Listing 1: Code snippet with callbacks and HTTP requests

```
1   Class MainActivity {
2       String favCityId, cityName, cityId;
3       protected void onCreate( ){
4           favCityID = readFromSetting("favCityId"); //static
5           cityNameSpinner . setOnItemSelectedListener(new OnItemSelectedListener( ){
6               public void onItemSelected( ) {
7                   cityName = cityNameSpinnner.getSelectedItem( ).toString( );//dynamic
8               }});
9           submitBtn.setOnClickListener(new OnClickListener( ){
10              public void onClick( ){
11                  cityId = cityIdInput.getText( ).toString( );//dynamic
12                  URL url1 = new URL(getString("domain")+"weather?&cityId="+favCityId);
13                  URL url2 = new URL(getString("domain")+"weather?&cityName="+cityName);
14                  URL url3 = new URL(getString("domain")+"weather?&cityId= "+cityId);
15                  URLConnection conn1 = url.openConnection( );
16                  Parse(conn1.getInputStream( ));
17                  URLConnection conn2 = url2.openConnection( );
18                  Parse(conn2.getInputStream( ));
19                  URLConnection conn3 = url3.openConnection( );
20                  Parse(conn3. getInputStream( ));
21                  startActivity(DisplayActivity.class);
22              }});
23      }
24  }
```

The motivation for PALOMA may be that one can significantly reduce the user-perceived latency by prefetching certain network requests. For instance, Listing 1 corresponds to a scenario in which a user selects a city name from the drop-down box cityNameSpinner (Line 7), then clicks submitBtn (Line 9) to get the city's weather information through an HTTP request. To reduce the time the user will have to wait to receive the information from the remote server, a prefetching scheme would submit that request immediately after the user selects a city name, i.e., before the user clicks the button.

Prefetching HTTP requests may be possible for two reasons. First, an HTTP request's destination URL can sometimes be known before the actual request is sent out, such as the static URL url1 (Line 12) in Listing 1. Second, there may often be sufficiently long slack between the time a request's URL value is known and when the request is sent out, due to the other code's execution and the "user think time". Prefetching in effect "hides" the network latency by overlapping the network requests with the slack period.

The challenges to efficiently prefetching HTTP requests involve determining (1) which HTTP requests to prefetch, (2) what their destination URL values are, and (3) when to prefetch them. Prior work addressed these challenges by relying on various server hints, developer annotations, and patterns of historical user behaviors. One goal is to avoid relying on such external information that may be difficult to obtain, and instead to use only program analysis on the app.

Several terms may be defined as follows for describing the approach to program analysis-based prefetching of network requests.

URL Spot may be a code statement that creates a URL object for an HTTP request based on a string denoting the endpoint of the request. Example URL Spots are Lines 12, 13, and 14 in Listing 1.

Definition Spot$_{m,n}$ may be a code statement where the value of a dynamic URL string is defined, such as Lines 7 and 11 in Listing 1. m denotes the mth substring in the URL string, and n denotes the nth definition of that substring in A single statement of code may represent multiple Definition Spots, each of which may be associated with a dynamic string used in different URLs.

Fetch Spot may be a code statement where the HTTP request is sent to the remote server. Example Fetch Spots are Lines 16, 18, and 20.

Callback may be a method that is invoked implicitly by the Android framework in response to a certain event. Example callbacks from Listing 1 include the onItemSelected( ) (Line 6) and onClick( ) (Line 10) methods. These are referred to as event handler callbacks in Android as they respond to user interactions. Android also defines a set of lifecycle callbacks that respond to the change of an app's "life status", such as the onCreate( ) method at Line 3.

Call Graph may be a directed graph representing the explicit invocation relationships between procedures in the app code.

Target Method may be a method that contains at least one Fetch Spot. The Target Method is named that because identifying methods that contain Fetch Spots may be the target of PALOMA's analysis. For example, the onClick( ) method is a Target Method because the Target Method contains three Fetch Spots. A Target Method may or may not be a Callback.

Target Callback may be a Callback that can reach at least one Target Method in a Call Graph. When a Target Method itself is a Callback, the target method is also a Target Callback. For example, the onClick( ) Callback defined at Lines 10-22 of Listing 1 is a Target Callback.

FIG. 1 is a diagram that illustrates a CCFG extracted from Listing 1 using the GATOR analysis technique 100. Callback Control-Flow Graph (CCFG) represents the implicit-invocation flow involving different Callbacks. In a CCFG, nodes represent Callbacks, and each directed edge f→s denotes that s is the next Callback invoked after f. FIG. 1 illustrates the CCFG extracted from Listing 1 using GATOR, a recently-developed analysis technique. A wait node in a CCFG (e.g., wn1 104 in FIG. 1) indicates that the user's action may be required and the event she triggers will determine which one of the subsequent callbacks is invoked.

Trigger Callback may be any Callback in the CCFG that is an immediate predecessor of a Target Callback with only a wait node between them. For instance, in Listing 1, the Trigger Callbacks for the Target Callback onClick( ) 106 are onCreate( ) 102 (path 1→2) and onItemSelected( ) 110 (path 5→2). Note that onClick( ) cannot be the Trigger Callback for DisplayActivity's onCreate( ) 108 method (path 3) because there may be no wait node between them.

Trigger Point may be the program point that triggers the prefetching of one or more HTTP requests.

Figure 2:
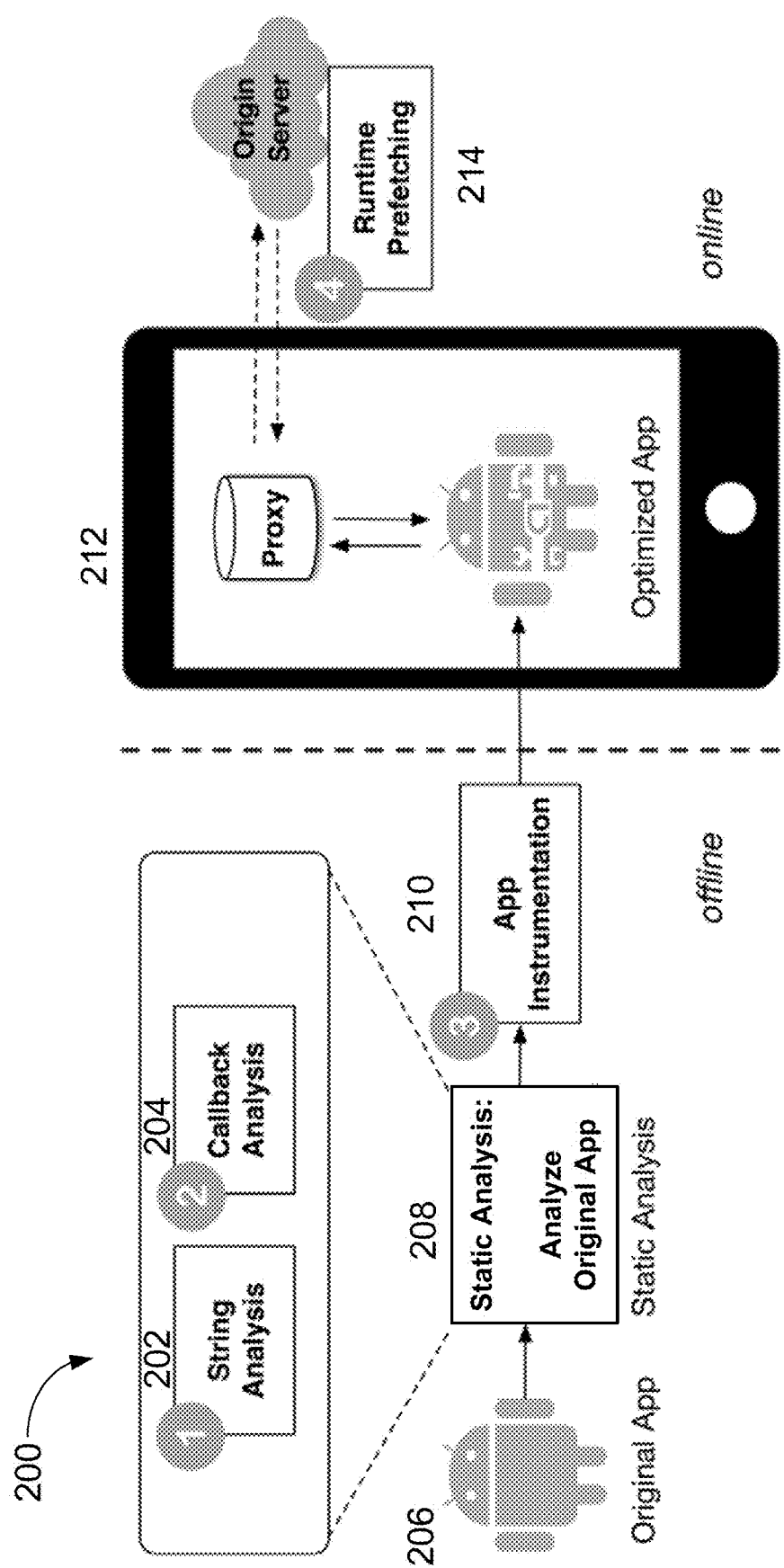
FIG. 2 is a diagram illustrating Program Analysis for Latency Optimization of Mobile Apps (PALOMA), which employs an offline-online collaborative strategy.

FIG. 2 is a diagram illustrating an example high-level overview of the Program Analysis for Latency Optimization of Mobile Apps (PALOMA) 200 approach, which employs an offline-online collaborative strategy. PALOMA may be a prefetching-based solution for reducing user-perceived latency in mobile apps that does not require any developer effort or remote server modifications. PALOMA may be motivated by the following three challenges: (1) which HTTP requests can be prefetched, (2) what their URL values are, and (3) when to issue prefetching requests. Static program analysis can help us address all three challenges. To that end, PALOMA employs an offline-online collaborative strategy shown in FIG. 2. The offline component automatically transforms a mobile app into a prefetching-enabled app, while the online component issues prefetching requests through a local proxy.

To address the limitations of current work, the systems and methods described herein may be designed as a client-centric approach that may be automatic, easy to deploy, and extensible to different domains. The approach may optimize the original app based on static analysis, prefetch future HTTP requests and cache the responses, so that the on-demand HTTP requests may be responded to immediately from a local proxy with "zero" network latency. The insight is that there is usually an idle slot between two user interactions (e.g., user think time), which provides the potential to prefetch latency-hogging operations. The approach overview is shown in FIG. 2. The original app may be rewritten based on the information extracted by static analysis so that the optimized app 212, 320 interacts with the local proxy instead of the original server 212. In detail, the approach may have three phases: static analysis, app instrumentation, and dynamic adaptation, which are explained herein.

PALOMA has four major elements. PALOMA first performs two static analyses: PALOMA (1) identifies HTTP requests suitable for prefetching via string analysis 202, and (2) detects the points for issuing prefetching requests (i.e., Trigger Points) for each identified HTTP request via callback analysis 204. PALOMA then (3) instruments the app automatically based on the extracted information and produces an optimized, prefetching-enabled app. Finally, at runtime, the optimized app will interact with a local proxy deployed on the mobile device. The local proxy (4) issues prefetching 214 requests on behalf of the app and caches prefetched resources so that future on-demand requests can be serviced immediately. The four elements are detailed next.

In the static analysis phase 208, a system may analyze the original app 206 statically to extract the Callback Control Flow Graph (CCFG) and HTTP Request Model (HRM). The CCFG shows the sequence of callbacks from the framework to the application code, both for lifecycle callbacks and for event handler callbacks. CCFG represents the state transitions between user-driven events so that all the possible future states, such as the states after "onClick", may be known at a current state. Only those HTTP requests in the immediate-next states are selected for prefetching at a current state. Long-term future requests are not prefetched because the cache may be more likely to expire. The HRM may be a string based model that represents the string values of the HTTP requests including target URL, a set of headers, and parameters. The string values of the identified HTTP requests may be interpreted statically using Violist. For those values that are unknown statically (e.g., user input), all the definition spots in different paths may be marked for app instrumentation 210. Definition spots may be the line numbers where the concrete string values are obtained at runtime.

The goal of string analysis may be to identify the URL values of HTTP requests. Prefetching can only happen when the destination URL of an HTTP request is known. An aspect to string analysis may be to differentiate between static and dynamic URL values. A static URL value may be the substring in a URL whose concrete value can be determined using conventional static analysis. In contrast, a dynamic URL value may be the substring in a URL whose concrete value depends on user input. For this reason, the Definition Spots of dynamic URL values may be identified and the actual value discovery may be postponed until runtime.

Figure 3:
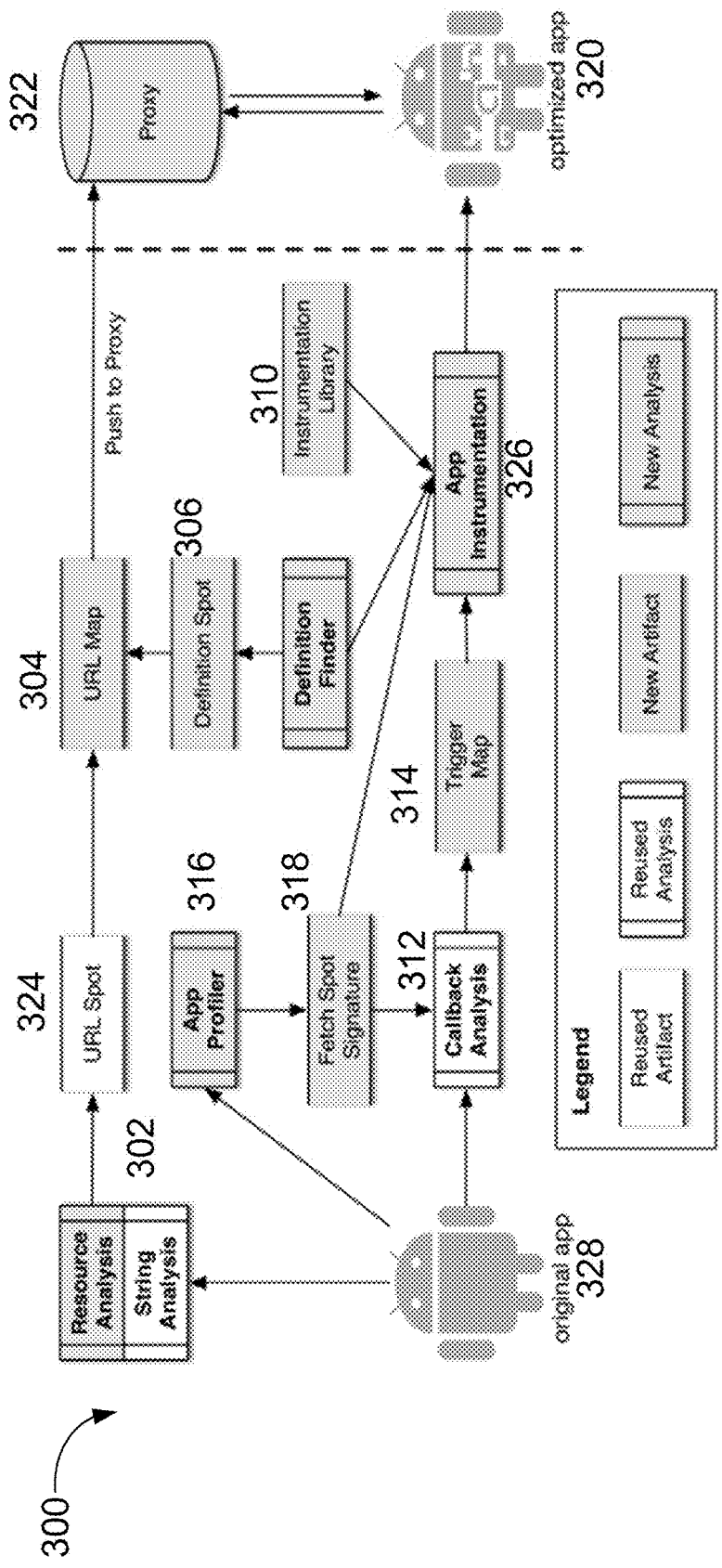
FIG. 3 is a diagram illustrating an output of string analysis as a URL Map that may be used by the proxy at runtime, and the Definition Spot in the URL Map and the Trigger Map that may be used by an App Instrumentation step.

FIG. 3 is a diagram illustrating an output 300 of resource analysis and string analysis 302 as a URL Map 304 that may be used by the proxy at runtime, and the Definition Spot 324 in the URL Map 304 that may be used by an App Instrumentation step 326. FIG. 3 illustrates PALOMA's detailed workflow. In the illustrated example different analysis tools that may be employed by PALOMA and artifacts produced by PALOMA are depicted. The URL Map 304 relates each URL substring with the URL Map's concrete value (for static values) or Definition Spots 306 (for dynamic values). In the example of Listing 1, the entry in the URL Map that may be associated with url2 would be {url2: ["http://weatherapi/", "weather?&cityName=", $L7_{3,1}$]}. URL Map creation for static and dynamic URL values is disclosed.

Static value analysis may be used to interpret the concrete value of each static substring, and a system may find the system's use-definition chain and propagate the value along the chain. To do that, a recent string analysis framework may be leveraged, Violist, that performs control- and data-flow analyses to identify the value of a string variable at any given program point. Violist may be unable to handle implicit use-definition relationships that are introduced by the Android app development framework. In particular, in Android, string values can be defined in a resource file that is persisted in the app's internal storage and retrieved during runtime. For instance, in Listing 1, all three URLs have a substring getString ("domain") (Lines 12-14), which is defined in the app's resource file. PALOMA extends Violist to properly identify this case and include the app's resource file that is extracted by decompiling the app in the control- and data-flow analysis. In the end, the concrete value of each static substring in each URL may be added to the URL Map.

Dynamic value analysis—Dynamic URL values cannot be determined by static analysis. Instead, PALOMA identifies the locations where a dynamic value may be defined, i.e., PALOMA's Definition Spots. The Definition Spots may be later instrumented such that the concrete values can be determined at runtime.

A challenge in identifying the Definition Spots may be that a URL string may be defined in a callback different from the callback where the URL is used. Recall that, due to the event-driven execution model, callbacks may be invoked implicitly by Android. Therefore, the control flow between callbacks on which the string analysis depends cannot be obtained by analyzing the app code statically. Solving the inter-callback data-flow problem may be an open problem in program analysis, because of the implicit control-flow among callbacks as well as the complex and varied types of events that can trigger callbacks at runtime, such as GUI events (e.g., clicking a button), system events (e.g., screen rotation), and background events (e.g., sensor data changes). Research efforts on understanding callbacks may be limited to specific objectives that prevent their use for string analysis in general. Such efforts have included a focus restricted to GUI-related callbacks (which may be used in callback analysis), assumption that callback control-flow can be in any arbitrary order, and analysis of the Android framework-level, but not app-level, code to construct callback summaries.

A hybrid static/dynamic approach may be used, where the static part conservatively identifies all potential Definition Spots, leaving to the runtime the determination of which ones are the actual Definition Spots. In particular, the Definition Spots of class fields may be focused on because a field may be a common way to pass data between callbacks. All potential Definition Spots may be identified in two ways. First, when a string variable is a private member of a class, all the Definition Spots inside that class may be included, such as constructor methods, setter methods, and definitions in the static block. Second, when a variable is a public member of a class, that variable can be defined outside the class and a whole-program analysis to find all assignments to the variable that propagate to the URL may be conducted.

At the end of the analysis, all substring Definition Spots for a URL may be added to the URL Map. It is worth noting that, although the static analysis may be conservative and multiple Definition Spots may be recorded in the URL Map, the true Definition Spot will emerge at runtime because false definitions will either be overwritten by a later true definition (i.e., a classic write-after-write dependency) or will never be encountered when they lie along unreachable paths.

Callback analysis determines where to prefetch different HTTP requests, i.e., the Trigger Points in the app code. There may be multiple possible Trigger Points for a given request, depending on how far in advance the prefetching request may be sent before the on-demand request may be actually be issued. The most aggressive strategy would be to issue an HTTP request immediately after the HTTP's URL value may be discovered. However, this approach may lead to many redundant network transmissions: the URL value may not be used in any on-demand requests (i.e., the URL value may be overwritten) or the callback containing the HTTP request (i.e., the Target Callback) may not be reached at runtime at all. In contrast, the most accurate strategy would be to issue the prefetching request right before the on-demand request may be sent. However, this strategy would yield no improvement in latency.

| Algorithm 1: IDENTIFYTRIGGERCALLBACKS |
| --- |
| Input: CCFG, ECG, App |
| Output: TriggerMap |
| 1    INSTRUMENTTIMESTAMP(App) |
| 2    NetworkMethodLogs ← Profile(App) |
| 3    Signature ← GETFETCHSIGNATURE(NetworkMethodLogs) |
| 4    Requests ← GETREQUESTS(Signature) |
| 5    TriggerMap = ∅ |
| 6    foreach req ∈ Requests do |

| Algorithm 1: IDENTIFYTRIGGERCALLBACKS |
| --- |
| 7       tarMethod ← GETTARGETMETHOD(req) |
| 8       TargetCallbacks ← FINDENTRIES(tarMethod, ECG) |
| 9       foreach tarCallback ∈ TargetCallbacks do |
| 10         \| TriggerCallbacks ← <br>            \| GETIMDIATEPREDECESSORS(tarCallback, CCFG) |
| 11         \| foreach trigCallback ∈ TriggerCallbacks do |
| 12            \| TriggerMap.ADD(trigCallback, req.url) |
| 13    return TriggerMap |

An example approach is to strike a balance between the two extremes. Specifically, PALOMA issues prefetching requests at the end of the callback that is the immediate predecessor of the Target Callback. Recall that the Target Callback's immediate predecessor may be referred to as Trigger Callback, because the Target Callback's immediate predecessor triggers prefetching. This strategy has the dual benefit of (1) taking advantage of the "user think time" between two consecutive callbacks to allow prefetching to take place, while (2) providing high prefetching accuracy as the Trigger Point may be reasonably close to the on-demand request.

As FIG. 3 illustrates, PALOMA creates a Trigger Map at the end of callback analysis that may be used by app instrumentation 300. The Trigger Map maps each Trigger Callback to the URLs that will be prefetched at the end of that callback. In the example of Listing 1, the Trigger Map will contain two entries:

{[onCreate]: [url1, url2, url3]}
{[onItemSelected]: [url1, url2, url3]} because both onCreate( ) and onItemSelected( ) may be Trigger Callbacks that are the immediate predecessors of the Target Callback onClick( ), which in turn contains url1, url2, and url3.

Algorithm 1 details how PALOMA identifies Trigger Callbacks 312 and constructs the Trigger Map 314. In addition to the app itself, the algorithm relies on two additional inputs, both obtained with the help of off-the-shelf-tools: the Callback Control-Flow Graph (CCFG) and the Call Graph (CG). Note that the CCFG used in callback analysis may be restricted to GUI callbacks that may be triggered by user actions. However, this fits PALOMA's needs given PALOMA's focus on user-initiated network requests. The CCFG captures the implicit-invocation flow of Callbacks in Android, and thus allows us to find the Trigger Callbacks of a given Target Callback. On the other hand, the CG, which may be extracted by Soot, captures the control flow between functions, and thus allows us to locate the Callbacks that contain any given method. However, the CG does not include the direct invocations that may be initiated from the Android framework. Such invocations from Android's documentation may be identified and extend the CG with the resulting direct edges. An example is the execute( )→doInBackground( ) edge from the AsyncTask class that may be widely used for network operations in Android. The thus extended CG may be referred to as ECG.

Given these inputs, PALOMA first identifies the signature of a Fetch Spot 318, i.e., the method that issues HTTP requests, by profiling 316 the app (Lines 1-3 of Algorithm 1). It was found that the profiling may be needed because the methods that actually issue HTTP requests under different circumstances can vary across apps. For example, the getInputStream( ) method from Java's URLConnection library may consume hundreds of milliseconds in one app, but zero in another app where, e.g., the getResponseCode( ) method consumes several hundred milliseconds. Thus, the signatures may be obtained by instrumenting timestamps in the app, and select the most time-consuming network operations according to the profiling results. Using the signatures, all HTTP requests that the app can possibly issue (Line 4) may be identified. In the example of Listing 1, the signature would be getInputStream( ) and the Requests would be conn1.getInputStream( ) conn2.getInputStream( ) and conn3.getInputStream( ). An example may iterate through each discovered request and identify the method in which the request may actually be issued, i.e., the Target Method (Line 7). Using the control flow information that the ECG provides, an example embodiment may locate all possible Target Callbacks of a Target Method (Line 8). An example embodiment may then iterate through each Target Callback and identify all of the embodiment's immediate predecessors, i.e., Trigger Callbacks, according to the CCFG (Line 10). Finally, an example embodiment may add each {Trigger Callback, URL} pair to the Trigger Map (Lines 11-12).

The app instrumentation phase may also be static, and the original app 328 may be instrumented based on the information extracted in the static analysis phase. The instrumentation may be two-fold: (1) for those definition spots identified in the static analysis phase, a statement may be inserted after each definition spot in order to send the concrete definition to the proxy at runtime; (2) for those identified HTTP requests, the target URLs may be replaced with the address of the proxy so that the prefetched responses can be returned immediately from the local proxy on the user's device.

Figure 4:
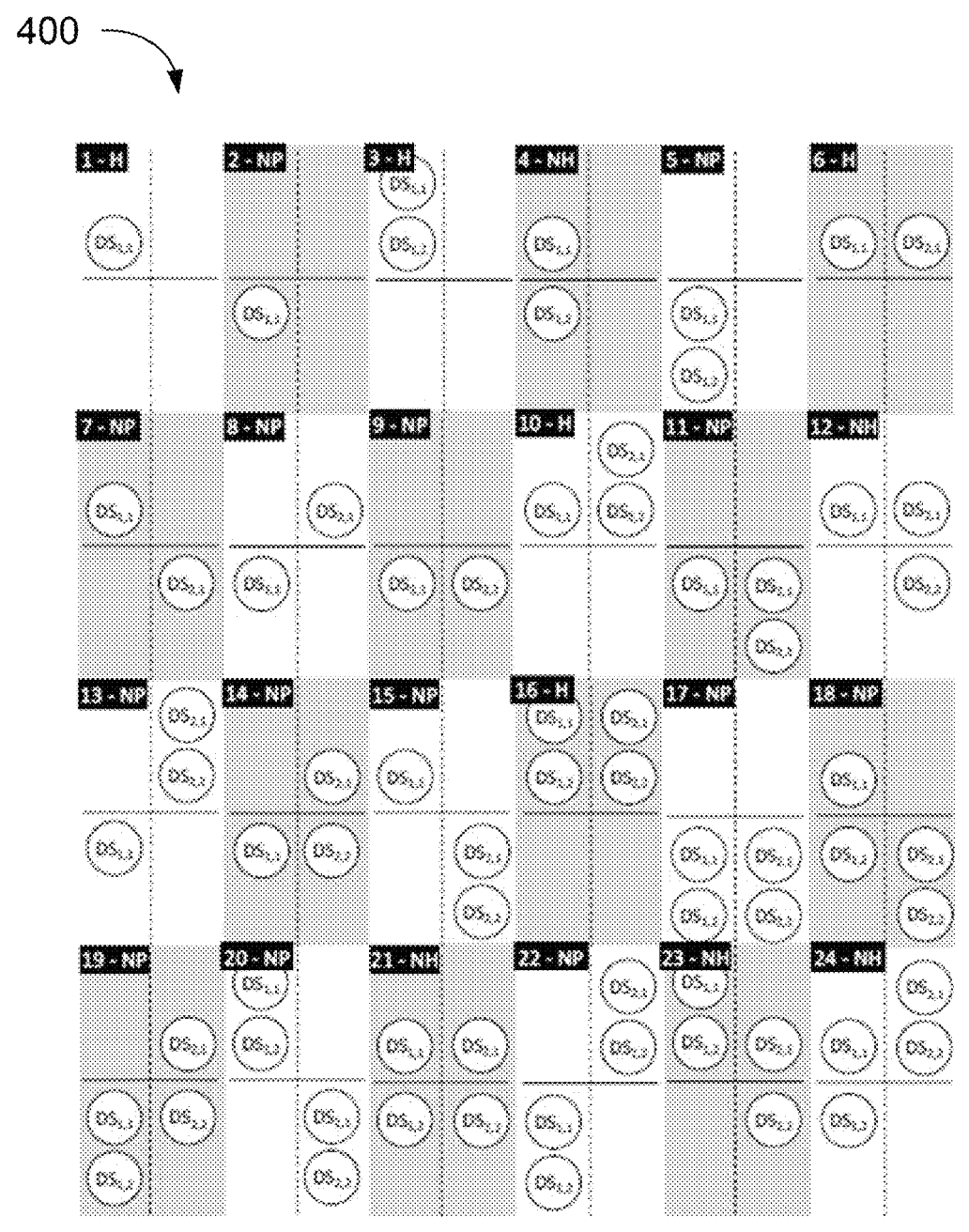

FIG. 4 is a diagram illustrating 24 cases 400 when an entire URL is not known statically. PALOMA instruments an app automatically based on the information extracted from the two static analyses, and produces an optimized, prefetching-enabled app as FIG. 4 illustrates. At runtime, the optimized app will interact with a local proxy 322 that is in charge of issuing prefetching requests and managing the prefetched resources. While PALOMA's app instrumentation may be fully automated and PALOMA's app instrumentation does not require the source code of the app, PALOMA also supports app developers who have the knowledge and the source code of the app to further improve runtime latency reduction via simple prefetching hints. The two instrumentation aspects are described next.

Figure 5:
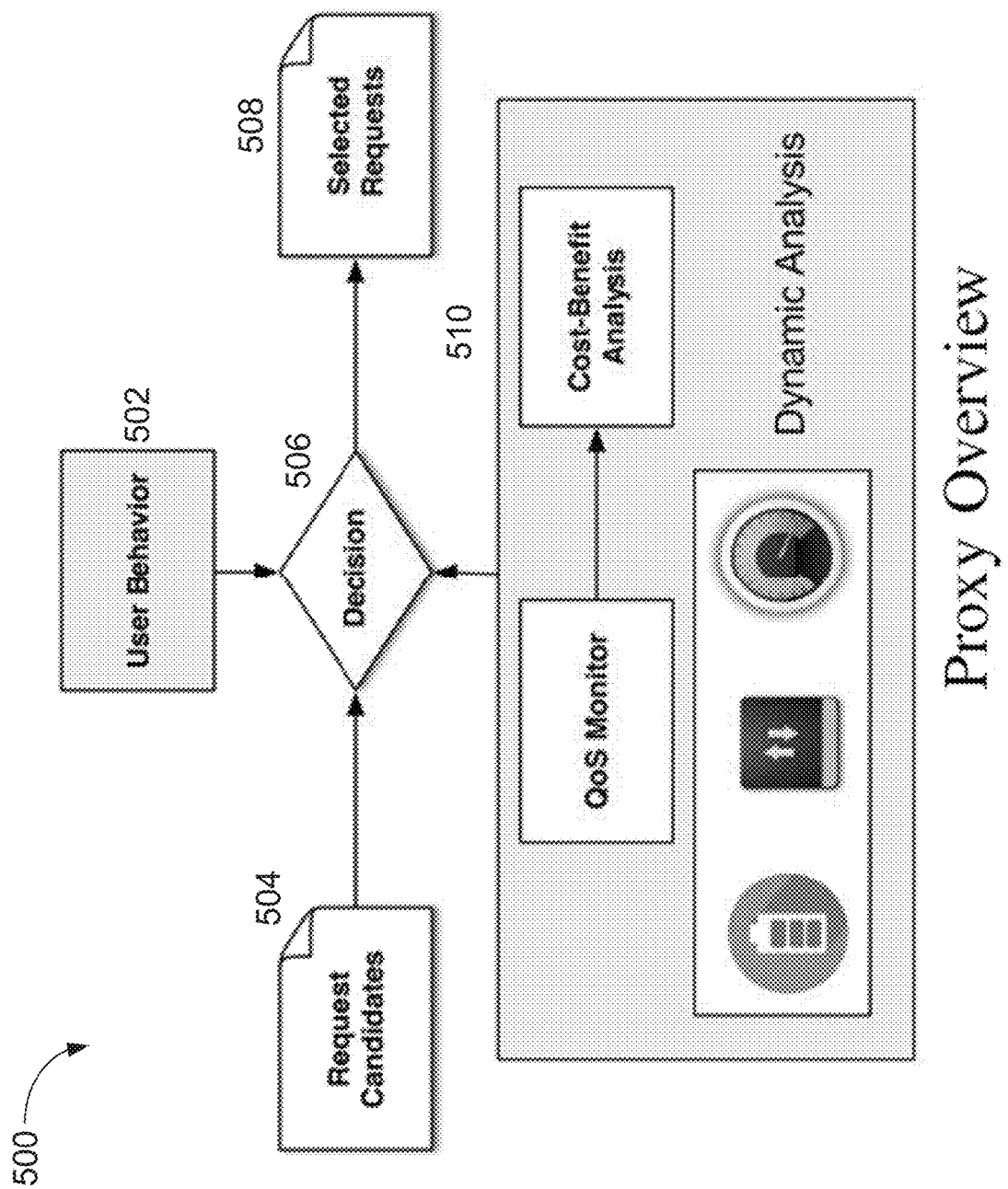
FIG. 5 is a diagram illustrating a proxy overview.

FIG. 5 is a diagram illustrating a proxy overview 500. In the dynamic adaptation phase, the modified app may be executed at runtime, interacting with the proxy instead of the original server. The proxy may be deployed on the mobile device, and it decides "what" and "when" a certain HTTP request may be sent to the original server and the corresponding response may be stored in the local cache. The dynamic adaptation may have two dimensions: (1) adapt to user behavior habits 502, filtering out the unlikely prefetch candidates, e.g., requesting candidates 504, making a decision 506, and selecting requests 508; (2) adapt to runtime QoS requirements 510, controlling how much to prefetch at runtime. FIG. 5 illustrates a closer look at the proxy. The proxy may store all the HTTP requests identified by string analysis in static analysis. At runtime, after the unknown string value may be known at the definition spot, the modified app sends the concrete value to the proxy. When every unknown value of one HTTP request is known, the certain HTTP request may be considered as a request candidate. The proxy may also conduct a cost-benefit analysis which monitors the runtime QoS conditions (i.e., battery life, cellular data usage, bandwidth) to schedule the prefetch according to QoS constraints.

PALOMA performs three types of instrumentation automatically. Each type introduces a new API that may implement in an instrumentation library 310. Listing 2 illustrates an instrumented version of the app from Listing 1, with the instrumentation code bolded. This example may be used to explain the three instrumentation tasks.

This instrumentation task updates the URL Map as new values of dynamic URLs may be discovered. Recall that the values of static URLs may be fully determined and inserted into the URL Map offline. This instrumentation may be achieved through a new API, sendDefinition (var, url, id), which indicates that var contains the value of the idth substring in the URL named url. The resulting annotation may be inserted right after each Definition Spot. For instance, at Line 8 of Listing 2, PALOMA will update the third substring in url2 with the runtime value of cityName. This ensures that the URL Map will maintain a fresh copy of each URL's value and will be updated as soon as new values are discovered.

This instrumentation task triggers prefetching requests at each Trigger Point. A Trigger Point in PALOMA may be at the end of a Trigger Callback. This choice was made for two reasons: on one hand, the choice makes no discernible difference in terms of performance where an example embodiment may prefetch within the same callback; on the other hand, placing the Trigger Point at the end may be more likely to yield known URLs (e.g., when the Definition Spot may also be within the Trigger Callback). PALOMA provides this instrumen¬tation via the triggerPrefetch (url1, . . . ) API. The URLs that are to be prefetched may be obtained from the Trigger Map constructed in the callback analysis. For instance, PALOMA triggers the proxy to prefetch url1, url2, and url3 at the end of onItemSelected( ) (Line 9) and onCreate( ) (Line 26) of Listing 2, which may be consistent with the Trigger Map.

The Redirect Requests may be an instrumentation task that redirects all on-demand HTTP requests to PALOMA's proxy instead of the origin server. This allows on-demand requests to be served from the proxy's cache, without latency-inducing network operations. The cases where the proxy's cache does not contain the response to a request are also discussed herein. The request redirection may be achieved through the fetchFromProxy(conn) API, where conn indicates the original URL connection, which may be passed in case the proxy still needs to make the on-demand request to the origin server. This instrumentation replaces the original methods at each Fetch Spot: calls to the getInputStream( ) method at Lines 16, 18, and 20 of Listing 1 may be replaced with calls to the fetchFromProxy(conn) method at Lines 19, 21, and 23 in Listing 2.

Although PALOMA can automatically instrument mobile apps without developer involvement, PALOMA also provides opportunities for developers to add hints in order to better guide the prefetching. In particular, PALOMA enables two ways for developers to provide hints: by using PALOMA's instrumentation APIs, and by directly modifying PALOMA's artifacts. The two approaches are described below.

Listing 2: Example code of the optimized app

```
1   Class MainActivity {
2       String favCityId, cityName, cityId;
3       protected void onCreate( ){
4           favCityID = readFromSetting("favCityId"); /static
5           cityNameSpinner . setOnItemSelectedListener(new OnItemSelectedListener( ){
6               public void onItemSelected( ) {
7                   cityName = cityNameSpinnner.getSelectedItem( ).toString( );//dynamic
8                   sendDefinition(cityName, url2, 3);
9                   triggerPrefetch(url1, url2, url3);
10              }});
11          submitBtn.setOnClickListener(new OnClickListener( ){
12              public void onClick( ){
13                  cityId = cityIdInput.getText( ).toString( );//dynamic
14                  sendDefinition(cityId, url3, 3);
15                  URL url1 = new URL(getString("domain")+"weather?&cityId="+favCityId);
16                  URL url2 = new URL(getString("domain")+"weather?&cityName="+cityName);
17                  URL url3 = new URL(getString("domain")+"weather?&cityId="+cityId);
18                  URLConnection conn1 = url.openConnection( );
19                  Parse(fetchFromProxy(conn1));
20                  URLConnection conn2 = url2.openConnection( );
21                  Parse(fetchFromProxy(conn2));
22                  URLConnection conn3 = url3.openConnection( );
23                  Parse(fetchFromProxy(conn3));
24                  startActivity(DisplayActivity.class);
25              }});
26          triggerPrefetch(url1, url2, url3);
27      }
28  }
```

API support—PALOMA's three API functions defined in the instrumentation library—sendDefinition( ) trigger-Prefetch( ) and fetchFromProxy( ) can be invoked by the developers explicitly in the app code. For instance, when a developer knows where the true Definition Spots are, she can invoke sendDefinition( ) at those locations. Developers can also invoke triggerPrefetch( ) at any program point. For example, prefetching can happen farther ahead than may be done automatically by PALOMA when a developer knows that the responses to a prefetching request and the prefetching request's corresponding on-demand request will be identical.

Artifact modification may use PALOMA's instrumentation APIs if the manner described above requires modifications to the app source code. An alternative may be to directly modify the artifacts generated by PALOMA's static analyses—Trigger Map, Fetch Spot Signature, and Definition Spot (recall FIG. 3)—without altering the code. For example, a developer can add an entry in the Trigger Map; as a result, PALOMA's instrumentation will automatically insert a call to triggerPrefetch( ) at the end of the Trigger Callback specified by the developer.

Two frequently occurring instances have been introduced where developers may be well positioned to provide prefetching hints with very little manual effort. These hints can be provided using either of the above two approaches.

The prefetching at app launch may include launching an app, and may take several seconds or more because many apps request remote resources, generally toward the end of the launch process. The URLs of the launch-time requests are usually statically known, but the ways in which the URL values can be obtained may be highly app-dependent. For instance, apps may retrieve the request URLs from a configuration file or a local database. Supporting those cases in PALOMA's string analysis would mean that PALOMA may need to understand the semantics of each individual app, which may not be a reasonable requirement. However, a practical alternative may be for developers to provide prefetching hints because they understand their own apps' behavior. One way developers could implement this may be to insert into the URL Map additional static URLs and then call triggerPrefetch( ) at the beginning of onCreate( ), which for PALOMA's purposes can be treated as the app entry point in most Android applications.

The ListView class may be commonly used in Android apps to display the information of a list of items. The app "jumps" to another page to display further information based on the item a user selects in the list. The URL fetched for the page to which the app "jumps" may generally only be known after the user selects the item in the list. Ordinarily, this would prevent prefetching. However, Android apps tend to exhibit two helpful trends. First, the list view usually displays similar types of information. Second, the further information obtained by selecting an item may be related to the information displayed in the list itself. Based on these observations, an example embodiment may identify and may exploit in PALOMA similar patterns in the URLs for the list and the subsequent page. Consider a wallpaper app for illustration: the URL that is fetched to render an item in the list view may be "image1Url_small.jpg", while the URL that is fetched after the user selects image1 may be "image-1Url_large.jpg". Based on this pattern, manually adding Definition Spots of the URLs that may be fetched in the list view and sending modified values to the proxy may be exploited, such as replacing "small" with "large" in the wallpaper example.

Algorithm 2: TRIGGERPREFETCH

```
    Input: Requests
1   foreach req ∈ Requests do
2   |   if ISKNOWN(req.url) and ¬ISCACHED(req) then
3   |   |   SETWAITFLAG(reg)
4   |   |   response ← req.FETCHREMOTERESPONSE( )
5   |   |   cache.PUT(req.response)
6   |   __UNWAIT(req)
```

PALOMA's first three phases may be performed offline. By contrast, this phase captures the interplay between the optimized apps and PALOMA's proxy to prefetch the HTTP requests at runtime. The instrumented methods in an optimized app trigger the proxy to perform corresponding functions. The example from Listing 2 may be used to illustrate how the three instrumented functions interact with the proxy.

When the concrete value of the dynamic URL may be obtained at runtime, the inserted instrumentation method sendDefinition (var, url, id) may be executed and the concrete runtime value may be sent to the proxy. In response, the proxy updates the corresponding URL value in the URL Map. For instance, in Listing 2, when a user selects a city name from the cityNameSpinner (Line 7), the concrete value of cityName will be known, e.g., "Gothenburg". Then cityName may be sent to the proxy (Line 8) and the URL Map entry for url2 will be updated to {url2: ["http://weatherapi/", "weather?&cityName=","Gothenburg"]}.

When the inserted instrumentation method triggerPrefetch (url1, . . . ) may be executed, the method triggers the proxy to perform TRIGGERPREFETCH as shown in Algorithm 2. For each request that may be sent to the proxy by triggerPrefetch (url1, . . . ), the proxy checks when the whole URL of the request may be known but the response to the request has not yet been cached (Line 2). When both conditions are met, a "wait" flag may be set in the cache for that request (Line 3). This ensures that duplicated requests will not be issued in the case when the on-demand request may be made by the user before the response to the prefetching request has been returned from the origin server. In the example of Listing 2, when the app reaches the end of onCreate (Line 26), the app triggers the proxy to perform TriggerPrefetch(url1,url2,url3). Only url1 meets both conditions at Line 2 of Algorithm 2: the URL value may be concrete (it is, in fact, a static value) and the response is not in the cache. The proxy thus sets the "wait" flag for url1 in the cache, prefetches url1 from the origin server, stores the response in the cache, and finally sends an "unwait" signal to the on-demand request that is waiting for the prefetched request (Line 3-6). Thereafter, when the user selects a city name from the dropdown box, onItemSelected (Line 6 of Listing 2) will be triggered. At the end of onItemSelected (Line 9), TriggerPrefetch(url1,url2,url3) may be invoked again and url2 will be prefetched because url2's URL may be known (its dynamic value obtained at Line 8) and may not have been previously prefetched. In contrast, the value of url1 may be known at this point but url1 was already prefetched at Line 26, so the proxy will not prefetch url1.

| Algorithm 3: REPLACEDFETCH | |
|---|---|
| Input: req ∈ Requests | |
| Output: response ∈ Responses | |
| 1 | if ISCACHED(req) then |
| 2 | \| if GETWAITFLAG(req) is TRUE then |
| 3 | \| \| _WAIT(req) |
| 4 | \|_return cache.GETRESPONSE(req) |
| 5 | else |
| 6 | \| response ← req.FETCHREMOTERESPONSE( ) |
| 7. | \| cache.PUT(req.response) |
| 8. | _return response |

When the on-demand request is sent at the Fetch Spot, the replaced function fetchFromProxy(conn) will be executed, and the function will, in turn, trigger the proxy to perform REPLACEDFETCH as shown in Algorithm 3. When the request has a corresponding response in the cache, the proxy will first check the "wait" flag for the request. When the flag is set, the proxy will wait for the signal of the prefetching request (Line 3) and will return the response of the prefetching request when the response is back from the origin server (Line 4). When the "wait" flag has not been set, the response may already be in the cache and the proxy returns the response immediately with no network operations involved (Line 4). Otherwise, when the cache does not contain the response to the request, the proxy issues an on-demand request using the original URL connection conn to fetch the response from the origin server, stores the response in the cache, and returns the response to the app (Line 6-8). For instance, in Listing 2, when a user clicks submitBtn, fetchFromProxy(conn) will be executed to send on-demand requests for url1, url2, url3 to the proxy (Lines 19, 21, and 23 of Listing 2). The proxy, in turn, returns the responses to url1 and url2 from the local cache immediately because url1 and url2 may be prefetched at Lines 26 and 9, respectively, as discussed above. url3 is not known at any of the Trigger Points, so the response to url3 will be fetched from the origin server on demand as in the original app. Note that when a user did not select a city name from the dropdown box before clicking submitBtn, onItemSelected will not be triggered, meaning that Lines 8 and 9 of Listing 2 will not be executed. In this case, only the response for url1 will be returned from the cache (prefetched at Line 26), while the on-demand requests for url2 and url3 will be routed to the origin server.

A prototype has been implemented to optimize an Android app as a proof of concept. In the prototype, the original app fetches the weather information from OpenWeatherMap based on user's input and also fetches the weather information of user's favorite city in every search. The approach identified that all the values of "favorite city request" may be known statically and the values of two other requests may be based on user input (e.g., city name). The original app was rewritten so that the values of user input will be sent to the proxy once they are known at runtime. The proxy may be implemented as an Android Service and it checks whether all the values of the HTTP requests in the immediate-next states are known as the user state transits. If so, the proxy sends the actual request to the original server and stores the result. The instrumented timestamps showed that the response time of the HTTP requests may be reduced to 0 ms instead of 200 ms on average in the original app in a WiFi network environment. The prototype approach may be automated so that it will be effective and evaluated on a large number of apps.

PALOMA has been implemented by reusing and extending several off-the-shelf tools, and integrating them with newly implemented functionality. PALOMA's string analysis extends the string analysis framework Violist. The callback analysis may be implemented on top of the program analysis toolkit GATOR, and by extending GATOR's CCFG analysis. PALOMA's instrumentation component may be a stand-alone Java program that uses Soot to instrument an app. The proxy may be built on top of the Xposed framework that provides mechanisms to "hook" method calls. The proxy intercepts the methods that may be defined in PALOMA's instrumentation library and replaces their bodies with corresponding methods implemented in the proxy. The total amount of newly added code to extend existing tools, implement the new functionality, and integrate them together in PALOMA may be 3,000 Java SLOC.

This section describes the design of a microbenchmark (MBM) containing a set of test cases, which may be used to evaluate PALOMA's accuracy and effectiveness.

MBM thoroughly covers the space of prefetching options, wherein each test case contains a single HTTP request and differs in whether and how that request may be prefetched. The MBM may be restricted to individual HTTP requests because the requests may be issued and processed independently of one another. This means that PALOMA will process multiple HTTP requests simply as a sequence of individual requests; any concurrency in their processing that may be imposed by the network library and/or the OS may be outside PALOMA's purview. In practice, the look-up time for multiple requests varies slightly from one execution of a given app to the next. However, the look-up time required by PALOMA would not be noticeable to a user even with a large number of requests. As is shown, the number of HTTP requests in real apps may generally be bounded. Moreover, PALOMA only maintains a small cache that may be emptied every time a user quits the app.

The rest of this section will first lay out the goals underlying the MBM's design, and then present the MBM. An evaluation result illustrates that PALOMA may achieve perfect or near perfect accuracy when applied on the MBM, and leads to significant latency reduction with negligible runtime overhead.

The MBM may be designed to evaluate two fundamental aspects of PALOMA: accuracy and effectiveness.

PALOMA's accuracy pertains to the relationship between prefetchable and actually prefetched requests. Prefetchable requests may be requests whose URL values are known before the Trigger Point and thus can be prefetched. Quantitatively, an example may capture accuracy via the dual measures of precision and recall. Precision indicates how many of the requests that PALOMA tries to prefetch at a given Trigger Point were actually prefetchable. On the other hand, recall indicates how many requests are actually prefetched by PALOMA out of all the prefetchable requests at a given Trigger Point.

PALOMA's effectiveness may also be captured by two measures: the runtime overhead introduced by PALOMA and the latency reduction achieved by it. One objective may be to minimize the runtime overhead while maximizing the reduction in user-perceived latency.

The MBM may be built around the concept of prefetchablity. A request whose whole URL may be known before a given Trigger Point may be prefetchable. The case where the request is prefetchable and the response may be used by the app may be referred to as a hit. Alternatively, a request may be prefetchable but the response is not used because the definition of the URL may be changed after the Trigger Point. This may be referred to as a non-hit. The MBM aims to cover all possible cases of prefetchable and non-prefetchable requests, including hit and non-hit.

There may be three factors that affect whether an HTTP request may be prefetchable: (1) the number of dynamic values in a URL; (2) the number of Definition Spots for each dynamic value; and (3) the location of each Definition Spot relative to the Trigger Point. The properties of prefetchable and hit may be formally defined considering the three factors. The formal definitions will let us succinctly describe test cases later.

Formal Definition. Let M be the set of Definition Spots before the Trigger Point and N the set of Definition Spots after the Trigger Point, which may be within the Target Callback. Let us assume that a URL has $k \geq 1$ dynamic values. (The case where $k=0$, i.e., the whole URL may be static, is considered separately.) Furthermore, let us assume that the dynamic values may be the first k values in the URL. The ith dynamic value ($1 \leq i \leq k$) has $di \geq 1$ Definition Spots in the whole program. A request is:

prefetchable iff $\forall i \ \exists (j \in [1 \ldots d_i]) | DefSpot_{i,j} \in M$
(every dynamic value has a DefSpot before Trigger Point)
hit iff prefetchable $\land \ \forall (j \in [2 \ldots d_i]) | DefSpot_{i,j} \in M$
(all dynamic value DefSpots are before Trigger Point)
non-hit iff prefetchable $\land \ \exists (j \in [2 \ldots d_i]) | DefSpot_{i,j} \in N$
(some dynamic value DefSpots are after Trigger Point)
non prefetchable iff $\forall (j \in [1 \ldots d_i]) \exists i | DefSpot_{i,j} \in N$
(all DefSpots for a dynamic value are after Trigger Point)

Without loss of generality, MBM covers all cases where $k \leq 2$ and $di \leq 2$. Cases where $k>2$ or $di>2$ are not considered because only two dynamic values are needed to cover the non-prefetchable case—where some dynamic values are unknown at the Trigger Point—and two Definition Spots to cover the non-hit case—where some dynamic values are redefined after the Trigger Point.

There may be a total of 25 possible cases involving configurations with $k \leq 2$ and $di \leq 2$. The simplest case may be when the entire URL is known statically (referred to as case 0). The remaining 24 cases may be diagrammatically encoded in FIG. 4: the two dynamic URL values are depicted with circles and delimited with the vertical line; the location of the Trigger Point is denoted with the horizontal line; and the placement of the circles marks the locations of the dynamic values' Definition Spots ("$DS_{i,j}$" in the figure) with respect to the Trigger Point. The 24 cases can be grouped as follows:

single dynamic value—cases 1-5;
two dynamic values, one Definition Spot each—cases 6-9;
two dynamic values, one with a single Definition Spot, the other with two—cases 10-15; and
two dynamic values, two definition spots each—cases 16-24.

Each case is labeled with each case's prefetchable/hit property ("H" for hit, "NH" for non-hit, and "NP" for non-prefetchable). Of particular interest are the six cases—0, 1, 3, 6, 10, and 16—that represent the hits that should allow PALOMA to prefetch the corresponding requests and hence significantly reduce the user-perceived latency.

We implemented the MBM as a set of Android apps along with the remote server to test each of the 25 cases. The server may be built with Node.js and deployed on the Heroku cloud platform. The apps interact with the server to request information from a dataset in MongoDB. The evaluation was performed on the 4G network. The testing device was Google Nexus 5x running Android 6.0. Overall, the evaluation shows that PALOMA may achieve 100% precision and recall without exception, introduce negligible overhead, and can reduce the latency to nearly zero under appropriate conditions (the hit cases discussed above).

Table 1 illustrates the results of each test case corresponding to FIG. 4, as well as case 0 in which the entire URL value is known statically. Each execution value may be the average of multiple executions of the corresponding MBM apps. The highlighted test cases are the hit cases that should lead to a significant latency reduction. The columns "SD", "TP", and "FFP" illustrate the average times spent in the corresponding PALOMA instrumentation methods in the optimized apps—sendDefinition( ) triggerPrefetch( ) and fetchFromProxy( ) respectively. The "Orig" column illustrates the execution time of the method invoked at the Fetch Spot in the original app, such as getInputStream( ).

The final column in the table, labeled "Red/OH" illustrates the percentage reduction in execution time when PALOMA may be applied on each MBM app. The reduction may be massive in each of the six hit cases (≥99%). Applying PALOMA also resulted in reduced average execution times in 11 of the 19 non-hit and non-prefetchable cases. The more expected scenario occurred in the remaining eight of the non-hit and non-prefetchable cases: applying PALOMA introduced an execution overhead (shown as negative values in the table). The largest runtime overhead introduced by PALOMA was 149 ms in case 11, where the original response time was 2,668 ms. The value was due to a couple of outliers in computing the average execution time, and may be attributable to factors in the evaluation environment other than PALOMA, such as network speed; the remaining measurements were significantly lower. However, even this value is actually not prohibitively expensive: recall that PALOMA may be intended to be applied in cases in which a user may generally spend multiple seconds deciding what event to trigger next.

TABLE 1

Results of PALOMA's evaluation using MBM apps covering the 25 cases.

| Case | SD (ms) | TP (ms) | FFP (ms) | Orig (ms) | Red/OH |
|---|---|---|---|---|---|
| 0 | N/A | 2 | 1 | 1318 | 99.78% |
| 1 | 0 | 5 | 0 | 15495 | 99.97% |
| 2 | 0 | 1 | 2212 | 2659 | 16.81% |
| 3 | 1 | 4 | 1 | 781 | 99.24% |
| 4 | 2 | 5 | 611 | 562 | −9.96% |
| 5 | 0 | 2 | 2588 | 2697 | 3.97% |
| 6 | 1 | 4 | 2 | 661 | 98.95% |
| 7 | 1 | 4 | 2237 | 2399 | 6.54% |
| 8 | 1 | 9 | 585 | 568 | 4.75% |
| 9 | 2 | 2 | 611 | 584 | −5.31% |
| 10 | 1 | 5 | 0 | 592 | 98.99% |
| 11 | 2 | 2 | 2813 | 2668 | −5.58% |
| 12 | 2 | 6 | 546 | 610 | 8.16% |
| 13 | 2 | 3 | 2478 | 2753 | 10.87% |
| 14 | 3 | 3 | 549 | 698 | 20.49% |
| 15 | 5 | 1 | 631 | 570 | −11.75% |
| 16 | 1 | 11 | 0 | 8989 | 99.87% |
| 17 | 0 | 3 | 418 | 555 | 31.83% |
| 18 | 2 | 6 | 617 | 596 | −4.87% |
| 19 | 4 | 6 | 657 | 603 | −10.61% |
| 20 | 1 | 3 | 620 | 731 | 17.15% |
| 21 | 2 | 10 | 611 | 585 | −6.50% |
| 22 | 2 | 7 | 737 | 967 | 29.62% |
| 23 | 2 | 9 | 608 | 607 | −1.98% |
| 24 | 1 | 10 | 611 | 715 | 14.95% |

"SD", "TP", and "FFP" denote the runtimes of the three PALOMA instrumentation methods.
"Orig" may be the time required to run the original app.
"Red/OH" represents the reduction/overhead in execution time when applying PALOMA.

PALOMA was also evaluated on third-party Android apps to observe PALOMA's behavior in a real-world setting. The same execution setup as in the case of the MBM may be used. Thirty-two apps may be used from the Google Play store. The selected apps may span a range of application categories—Beauty, Books & Reference, Education, Entertainment, Finance, Food & Drink, House & Home, Maps & Navigation, Tools, Weather, News & Magazines, and Lifestyle and vary in sizes—between 312 KB and 17.8 MB. The only other constraints in selecting the apps were that they were executable, relied on the Internet, and could be processed by Soot.

We asked two Android users to actively use the 32 subject apps for two minutes each, and recorded the resulting usage traces. The same traces on the apps' multiple times may be re-ran, to account for variations caused by the runtime environment. Then, the apps may be instrumented using PALOMA and repeat the same steps the same number of times. Each session started with app (re)installation and exposed all app options to users. As in the case of the MBM, the response times of the methods at the Fetch Spots between the original and optimized apps may be measured and compared.

TABLE 2

Results of PALOMA's evaluation across the 32 third-party apps.

|  | Min. | Max. | Avg. | Std. Dev. |
|---|---|---|---|---|
| Runtime Requests | 1 | 64 | 13.28 | 14.41 |
| Hit Rate | 7.7% | 100% | 47.76% | 28.81% |
| Latency Reduction | 87.41% | 99.97% | 98.82% | 2.3% |

Unlike in the case of the MBM, the ground-truth data for the third-party apps may not be available. Specifically, the knowable URLs at the Trigger Points would have to be determined manually, which may be prohibitively time-consuming and error prone. In fact, this would boil down to manually performing inter-callback data-flow analysis. For this reason, only two aspects of applying PALOMA on the third-party apps may be measured: the hit rate (i.e., the percentage of requests that have been hit out of all triggered requests) and the resulting latency reduction. Table 2 depicts the averages, outliers (min and max values), as well as the standard deviations obtained across all of the runs of the 32 apps.

Overall, the results illustrate that PALOMA achieves a significant latency reduction with a reasonable hit rate. There may be several interesting outlier cases. The minimum hit-rate may only be 7.7%. The reason is that the app in question fetches a large number of ads at runtime whose URLs may be non-deterministic, and only a single static URL is prefetched outside of those. There may be four additional apps whose hit rate may be below 20% because those apps are list-view apps, such as a wallpaper app, and they fetch large numbers of requests at the same time. In PALOMA, the threshold for the maximum number of requests to prefetch at once may be up to 5 (or other numbers, e.g., 1-10, or more). This parameter can be increased, but that may impact device energy consumption, cellular data usage, or other device parameters.

Similarly to the MBM evaluation, PALOMA achieves a reduction in latency of nearly 99% on average for "hit" cases. Given the average execution time for processing a single request across the 32 unoptimized apps of slightly over 800 ms, prefetching the average of 13.28 requests at runtime would reduce the total app execution time by nearly 11 s, or 9% of a two-minute session. Note that the lowest latency reduction was 87.41%. This was caused by on-demand requests that happen before the prefetching request may be returned. In those cases, the response time depends on the remaining wait time for the prefetching request's return. However, there were only 5 such "wait" requests among 425 total requests in the 32 apps. This strongly suggests that PALOMA's choice for the placement of Trigger Points may be effective in practice.

Prefetching of HTTP requests has been applied successfully in the browser domain. Unfortunately, approaches targeting page load times cannot be applied to mobile apps. The bottleneck for page load times may be resource loading, because one initial HTTP request will require a large number of subresources (e.g., images), which can only be discovered after the main source may be fetched and parsed. Thus, existing research efforts have focused on issues such as prefetching subresources, developer support for speculative execution, and restructuring the page load process. In mobile apps, the HTTP requests may always be lightweight: one request only fetches a single resource that does not require any further subresource fetching. Therefore, the work focuses on prefetching the future requests that a user may trigger rather than the subresources within a single request.

Researchers have recently begun exploring prefetching in the mobile app domain. One research thread has attempted to answer "how much" to prefetch under different contexts (e.g., network conditions), while assuming that "what" to prefetch is handled by the apps already. Another thread of work focuses on fast pre-launching by trying to predict what app the user will use next. By contrast, this work aims to provide an automated solution to determine "what" and "when" to prefetch for a given app in a general case. As discussed previously, other comparable solutions—server-based, human-based, history-based, and domain-based may have limitations which may be targeted directly in PALOMA.

PALOMA is believed to be the first technique to apply program analysis to prefetching HTTP requests in mobile apps in order to reduce user-perceived latency. Bouquet has applied program analysis techniques to bundle HTTP requests in order to reduce energy consumption in mobile apps. Bouquet detects Sequential HTTP Requests Sessions (SHRS), in which the generation of the first request implies that the following requests will also be made, and then bundles the requests together to save energy. This can be considered a form of prefetching. However, this work does not address inter-callback analysis and the SHRS may be in the same callback. Therefore, the "prefetching" only happens a few statements ahead (within milliseconds most of the time) and has no tangible effect on app execution time.

Systems and methods described herein aim to lay the foundation of client-centric approaches for latency minimization in mobile applications by leveraging program analysis techniques. It is believed that client-centric approaches may have large potential on latency minimization for mobile devices since they may be immediately deployable, privacy-preserving, and easy to scale. In addition, the prefetching technique is a promising direction but the precision may be an issue because mobile devices may be resource-constraint. Current works mainly rely on the history data and user behavior to predict "what" to prefetch, which may require learning time and it may be unable to achieve a high precision. Differently, the approach described herein may make prefetch decisions based on the static structure of the whole program, which may be a more reliable source of "what" to prefetch.

PALOMA may be a program analysis-based technique that reduces the user-perceived latency in mobile apps by prefetching certain HTTP requests. While PALOMA cannot be applied to all HTTP requests an app makes at runtime, PALOMA provides significant performance savings in practice. Several of PALOMA's current facets make PALOMA well suited for future work in this area, both by us and by others. For instance, PALOMA defines formally the conditions under which the requests may be prefetchable. This can lead to guidelines that developers could apply to make their apps more amenable to prefetching, and lay the foundations for further program analysis-based prefetching techniques. Some aspects of PALOMA may be improved, such as string analysis and callback analysis techniques. Another interesting direction may be to improve the precision and reduce the waste associated with prefetching by incorporating certain dynamic information (e.g., user behavior patterns, runtime QoS conditions). Finally, PALOMA's microbenchmark (MBM) forms a foundation for standardized empirical evaluation and comparison of future efforts in this area.

In some aspects, a built-in Java standard library is widely used by Android developers. When the developer is using a different library and/or knows which method(s) to optimize, then PALOMA's profiling step may not be needed. In some examples, an assumption may be used only to simplify the formalization. The order of the values in a URL may have no impact on whether the URL may be prefetchable and can thus be arbitrary. Soot may occasionally be unable to process an Android app for reasons that were undetermined. While the average app session length varies by user and app type, two minutes may be sufficiently long in some examples to observe representative behavior and, when necessary, to extrapolate the data to longer sessions.

Figure 6:
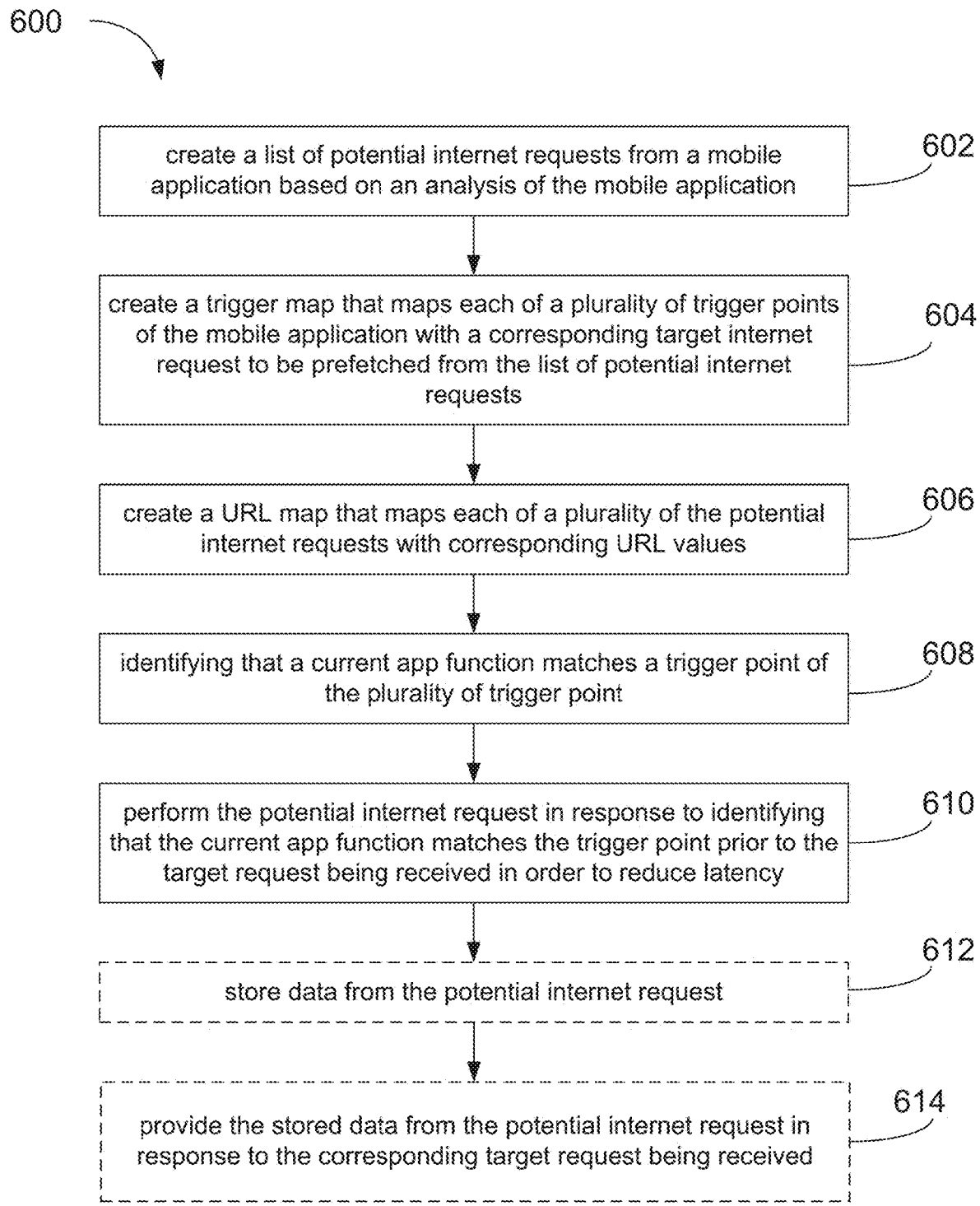
FIG. 6 is a diagram illustrating an example method.

FIG. 6 is a diagram illustrating an example method 600 for reducing latency in use of mobile applications. The method includes creating, e.g., by a processor, a list of potential internet requests from a mobile application based on an analysis of the mobile application (602). The method also includes creating, e.g., by the processor, a trigger map that maps each of a plurality of trigger points of the mobile application with a corresponding target internet request to be prefetched from the list of potential internet requests (604). Additionally, the method 600 includes creating, e.g., by the processor, a URL map that maps each of a plurality of the potential internet requests with corresponding URL values (606). The method 600 also includes identifying, e.g., by a mobile processor, that a current app function matches a trigger point of the plurality of trigger points (608). Additionally, the method 600 includes performing, by the mobile processor, the potential internet request in response to identifying that the current app function matches the trigger point prior to the target request being received in order to reduce latency (610). Optionally, the method 600 may include storing, e.g., in a memory, data from the potential internet request (612) and providing, e.g., by the mobile processor, the stored data from the potential internet request in response to the corresponding target request being received (614). In some embodiments, the mobile processor and the processor may be the same processor. In some embodiments, the mobile processor and the processor may be different processors.

Figure 7:
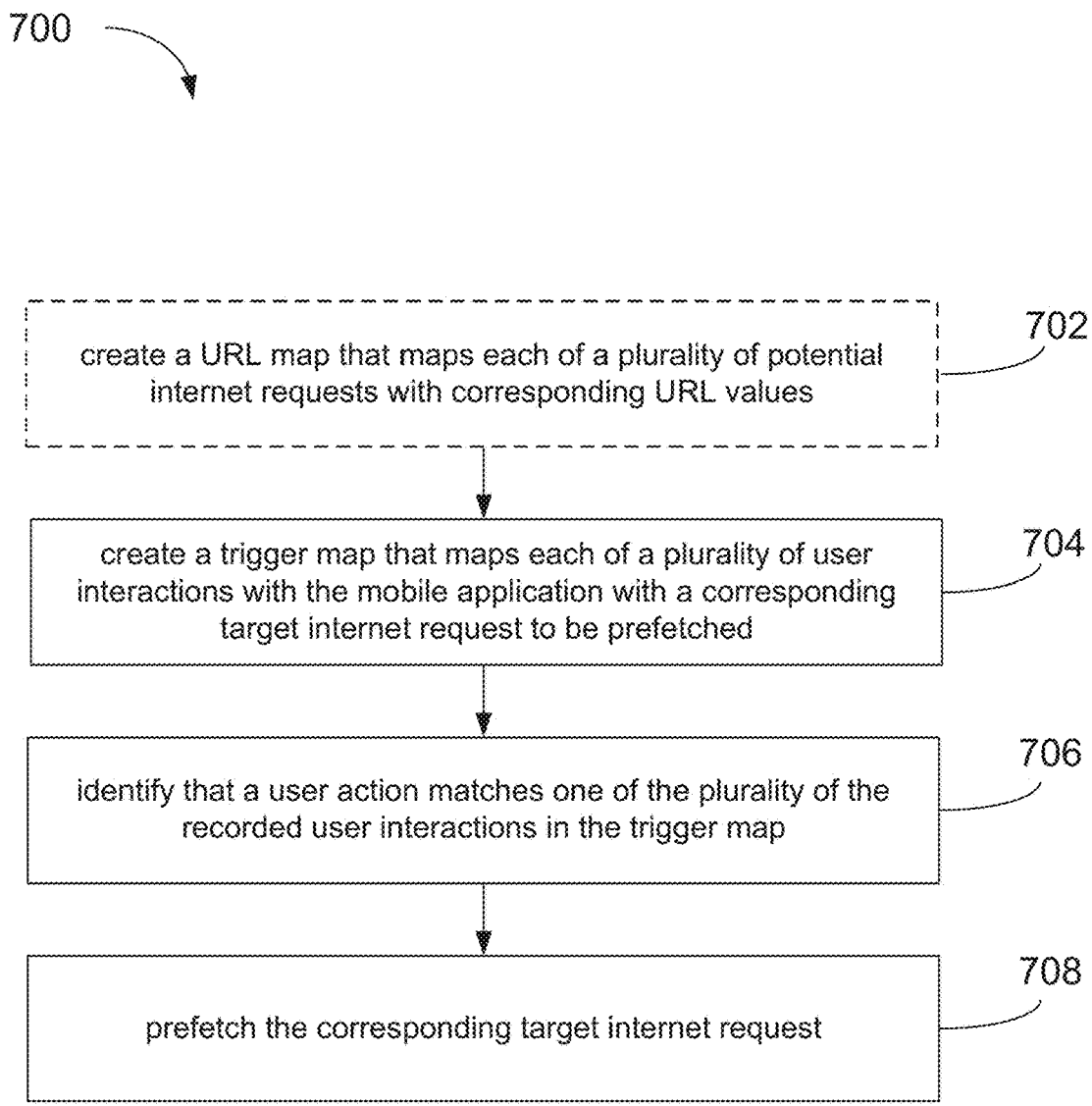
FIG. 7 is another diagram illustrating an example method.

FIG. 7 is another diagram illustrating an example method 700 for reducing latency in use of a mobile application. The method 700 include creating, by the processor, a uniform resource locator (URL) map that maps each of a plurality of potential internet requests with corresponding URL values (702). Prefetching the corresponding target internet request may be based on the URL map and the user input matching the one of the plurality of user interactions. The method 700 include creating, by a processor, a trigger map that maps each of a plurality of user interactions with the mobile application with a corresponding target internet request to be prefetched (704). The method 700 includes identifying, by a mobile processor, that a user action matches one of the plurality of the recorded user interactions in the trigger map (706). The method 700 includes prefetching, by the mobile processor, the corresponding target internet request (708). In some embodiments, the mobile processor and the processor may be the same processor. In some embodiments, the mobile processor and the processor may be different processors.

While the principles of this disclosure have been shown in various embodiments, many modifications of structure, arrangements, proportions, the elements, materials and components, used in practice, which may be particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for reducing latency in use of mobile applications comprising:
    analyzing, before an application runtime and by a processor, a mobile application to identify potential internet requests from the mobile application;
    creating, before the application runtime and by the processor, a list of the potential internet requests from the mobile application based on the analysis of the mobile application;
    creating, before the application runtime and by the processor, a trigger map that maps each of a plurality of trigger points of the mobile application with a corresponding target internet request to be prefetched from the list of potential internet requests;
    creating, before the application runtime and by the processor, a uniform resource locator (URL) map that maps each of a plurality of the potential internet requests with corresponding URL values;
    replacing, by the processor, the corresponding URL values with an address of a local proxy;
    identifying, at the application runtime and by a mobile processor, that a current app function matches a trigger point of the plurality of trigger points;
    automatically performing, by the mobile processor, the potential internet request in response to identifying that the current app function matches the trigger point prior to the target request being received by the processor in order to reduce latency and storing a response to the potential internet request at the local proxy prior to the target request being received by the mobile processor; and
    subsequently querying, by the mobile processor, the address of the local proxy to retrieve the potential internet request in response to the target request being received by the mobile processor.

2. The method of claim 1, further comprising:
    storing, in a memory, data from the potential internet request; and
    providing, by the mobile processor, the stored data from the potential internet request in response to the corresponding target request being received.

3. The method of claim 1, further comprising updating, by the mobile processor, a dynamic portion of the internet request in the URL map that changes based on user input at a runtime, wherein the list of potential internet requests includes a static portion and the dynamic portion that can change during runtime of the mobile application.

4. The method of claim 3, wherein the plurality of trigger points are each located at the end of a corresponding trigger function in order to increase a likelihood that the dynamic portion of the internet request is known.

5. The method of claim 1, wherein creating the list of potential internet requests, creating the URL map, and creating the trigger map are performed offline, and the list of potential internet requests, the URL map, and the trigger map are used to transform the mobile application into a new prefetching-enabled mobile application.

6. The method of claim 1, wherein the corresponding target request corresponds to user input received by an input device.

7. The method of claim 1, wherein the mobile application is run on a mobile operating system available under the trade name Android from Google of Mountain View, CA.

8. A system for reducing latency in use of mobile applications, the system configured to:
    analyze, before an application runtime and by a processor, a mobile application to identify potential internet requests from the mobile application;
    create, before the application runtime and by the processor, a list of the potential internet requests from the mobile application based on the analysis of the mobile application;
    create, before the application runtime and by the processor, a trigger map that maps each of a plurality of trigger points of the mobile application with a corresponding target internet request to be prefetched from the list of potential internet requests;
    create, before the application runtime and by the processor, a uniform resource locator (URL) map that maps each of a plurality of the potential internet requests with corresponding URL values;
    replace, by the processor, the corresponding URL values with an address of a local proxy;
    identify, at the application runtime and by a mobile processor, that a current app function matches a trigger point of the plurality of trigger points;
    automatically perform, by the mobile processor, the potential internet request in response to identifying that the current app function matches the trigger point prior to the target request being received by the processor in order to reduce latency and store a response to the potential internet request at the local proxy prior to the target request being received by the mobile processor; and subsequently query, by the mobile processor, the address of the local proxy to retrieve the potential internet request in response to the target request being received by the mobile processor.

\* \* \* \* \*